(12) United States Patent
White et al.

(10) Patent No.: US 11,022,062 B2
(45) Date of Patent: Jun. 1, 2021

(54) SYSTEMS AND METHODS FOR MONITORING A FUEL SYSTEM

(71) Applicant: POWER SOLUTIONS INTERNATIONAL, Inc., Wood Dale, IL (US)

(72) Inventors: Brian R. White, Stillwater, OK (US); Hans Kwok, Troy, MI (US); Ricky Lulloff, Oshkosh, WI (US); Gregory D. Aykens, Neenah, WI (US)

(73) Assignee: Power Solutions International, Inc., Wood Dale, IL (US)

( * ) Notice: Subject to any disclaimer, the term of this patent is extended or adjusted under 35 U.S.C. 154(b) by 0 days.

(21) Appl. No.: 16/516,482

(22) Filed: Jul. 19, 2019

(65) Prior Publication Data
US 2019/0338721 A1 Nov. 7, 2019

Related U.S. Application Data

(63) Continuation of application No. 15/875,117, filed on Jan. 19, 2018.

(Continued)

(51) Int. Cl.
*F02D 41/38* (2006.01)
*F02D 41/30* (2006.01)
(Continued)

(52) U.S. Cl.
CPC ......... *F02D 41/3082* (2013.01); *F02D 41/22* (2013.01); *F02D 41/3845* (2013.01); *F02M 37/0052* (2013.01); *F02M 51/04* (2013.01); *F02M 59/466* (2013.01); *F02D 41/0027* (2013.01); *F02D 41/062* (2013.01); *F02D 2041/1432* (2013.01);
(Continued)

(58) Field of Classification Search
CPC ........ F02D 2041/225; F02D 2041/226; F02M 59/466
USPC .............................. 73/114.43; 123/510, 529
See application file for complete search history.

(56) References Cited

U.S. PATENT DOCUMENTS 5,224,457 A 7/1993 Arsenault et al.
5,611,316 A 3/1997 Oshima et al.
(Continued)

FOREIGN PATENT DOCUMENTS

CN 102076938 5/2011
WO WO2013094589 * 6/2013

OTHER PUBLICATIONS

Office Action issued by the Canadian Patent Office in application No. 2,992,230 dated Dec. 3, 2018.

*Primary Examiner* — Erick R Solis
(74) *Attorney, Agent, or Firm* — McDonnell Boehnen Hulbert & Berghoff LLP

(57) ABSTRACT

An example system includes a controller configured to: receive pressure information indicative of a pressure level of the pressurized fuel between an electro-mechanical valve and an engine; based on the pressure level being below a first threshold pressure, send a first signal to open the electro-mechanical valve; determine, based on the pressure information, that the pressure level is increasing upon sending the first signal; in response to the pressure level increasing, send a second signal to activate a pump; determine that the pressure level has increased to a second threshold pressure; and provide information indicating that the engine is ready for operation.

19 Claims, 7 Drawing Sheets

Related U.S. Application Data

(60) Provisional application No. 62/448,659, filed on Jan. 20, 2017, provisional application No. 62/448,665, filed on Jan. 20, 2017.

(51) Int. Cl.
| | |
|---|---|
| *F02D 41/22* | (2006.01) |
| *F02M 37/00* | (2006.01) |
| *F02M 51/04* | (2006.01) |
| *F02M 59/46* | (2006.01) |
| *F02D 41/00* | (2006.01) |
| *F02D 41/06* | (2006.01) |
| *F02D 41/14* | (2006.01) |

(52) U.S. Cl.
CPC .. *F02D 2041/224* (2013.01); *F02D 2041/225* (2013.01); *F02D 2041/226* (2013.01); *F02D 2200/0602* (2013.01); *F02M 2200/247* (2013.01)

(56) References Cited

U.S. PATENT DOCUMENTS

| | | | |
|---|---|---|---|
| 5,623,907 A | 4/1997 | Cotton et al. | |
| 5,878,718 A | 3/1999 | Rembold et al. | |
| 6,044,806 A * | 4/2000 | Brown | F02D 19/025 123/27 GE |
| 6,581,573 B2 | 6/2003 | Nimura et al. | |
| 7,124,714 B2 | 10/2006 | Yamaoka et al. | |
| 8,967,123 B2 * | 3/2015 | Saito | F02D 19/025 123/529 |
| 9,422,900 B2 | 8/2016 | Pursifull | |
| 10,161,370 B2 * | 12/2018 | Sarwar | F02D 41/1401 |
| 2003/0230289 A1 * | 12/2003 | Yamaoka | F02D 19/025 123/529 |
| 2007/0224558 A1 | 9/2007 | Flick et al. | |
| 2010/0294250 A1 | 11/2010 | Jauss | |
| 2013/0104997 A1 | 5/2013 | Harper | |
| 2013/0312707 A1 | 11/2013 | Ham | |
| 2016/0138513 A1 | 5/2016 | Kim | |
| 2016/0245221 A1 * | 8/2016 | McEwan | F02D 41/047 |
| 2018/0010537 A1 | 1/2018 | Song et al. | |
| 2018/0209369 A1 | 7/2018 | White et al. | |
| 2020/0132023 A1 * | 4/2020 | Ishihara | F02D 41/0045 |

* cited by examiner

SYSTEMS AND METHODS FOR MONITORING A FUEL SYSTEM

CROSS REFERENCE TO RELATED APPLICATION

The present application is a continuation of U.S. patent application Ser. No. 15/875,117, filed on Jan. 19, 2018, which claims priority to U.S. Provisional Patent Application No. 62/448,659, filed on Jan. 20, 2017, and U.S. Provisional Patent Application No. 62/448,665, filed on Jan. 20, 2017, the entire contents of all of which are herein incorporated by reference as if fully set forth in this description.

BACKGROUND

A fuel system of a vehicle stores and delivers the fuel to a propulsion system (e.g., an engine) of the vehicle. Liquid propane is a desirable fuel for engines due to its availability and the fewer pollutants that result upon burning it. The fuel system may include a tank to store the fuel, a pump or any prime mover to pressurize the fuel, valves that control flow of fuel to and from the engine, and a plumbing network to transport the fuel between the various components of the fuel system.

Malfunction of any component of the fuel system may cause fuel leakage, which could be hazardous. Therefore, it is desirable to have an electronic control system that monitors the condition of the fuel system during various phases of operation of the vehicle to detect any malfunctions and accordingly take remedial actions.

SUMMARY

The present disclosure describes implementations that relate to monitoring a fuel system. In a first example implementation, the present disclosure describes a system. The system includes: (i) a tank containing fuel; (ii) a pump that is electronically controlled and configured to pressurize the fuel and provide pressurized fuel to an engine; (iii) an electro-mechanical valve disposed downstream from the pump and configured to control flow of the pressurized fuel to the engine; and (vi) a controller configured to perform operations prior to turning on the engine, the operations. The operations comprise: (i) with the pump and the electro-mechanical valve turned-off, receiving, from a pressure sensor, pressure information indicative of a pressure level of the pressurized fuel between the electro-mechanical valve and the engine, (ii) based on the pressure level being below a first threshold pressure, sending a first signal to open the electro-mechanical valve, (iii) determining, based on the pressure information, that the pressure level is increasing upon sending the first signal, (iv) in response to the pressure level increasing, sending a second signal to activate the pump, (v) determining that the pressure level has increased to a second threshold pressure, and (vi) providing information indicating that the engine is ready for operation.

In a second example implementation, the present disclosure describes a non-transitory computer readable medium having stored therein instructions that, when executed by a controller, cause the controller to perform operations in accordance with the first example implementation. In a third example implementation, the present disclosure describes a method including operations in accordance with the first example implementation.

In a fourth example implementation, the present disclosure describes a system. The system includes: (i) a tank containing fuel; (ii) a pump that is electronically controlled and configured to pressurize the fuel and provide pressurized fuel to an engine; (iii) an electro-mechanical valve disposed downstream from the pump and configured to control flow of the pressurized fuel to the engine; (iv) a mechanical shut-off valve disposed between the pump and the electro-mechanical valve, wherein the mechanical shut-off valve is normally-open and is configured to close to shut-off the flow of the pressurized fuel when a pressure difference thereacross exceeds a threshold pressure difference; and (v) a controller configured to perform operations prior to turning on the engine, the operations. The operations comprise: (i) with the pump and the electro-mechanical valve turned-off, receiving, from a pressure sensor, pressure information indicative of a pressure level of the pressurized fuel between the electro-mechanical valve and the engine, (ii) based on the pressure level being below a first threshold pressure, sending a first signal to open the electro-mechanical valve, (iii) determining, based on the pressure information, that the pressure level has increased upon sending the first signal, (iv) in response to determining that the pressure level has increased, sending a second signal to activate the pump, (v) after sending the second signal to activate the pump, determining that the pressure level has increased to a pressure value below a second threshold pressure, (vi) based on the pressure level increasing to the pressure value below the second threshold pressure, determining that the mechanical shut-off valve is closed, and (vii) in response to determining that the mechanical shut-off valve is closed: (a) deactivating the pump, and (b) sending a cyclic signal to the electro-mechanical valve.

In a fifth example implementation, the present disclosure describes a non-transitory computer readable medium having stored therein instructions that, when executed by a controller, cause the controller to perform operations in accordance with the fourth example implementation. In a sixth example implementation, the present disclosure describes a method including operations in accordance with the fourth example implementation.

In a seventh example implementation, the present disclosure describes a system. The system includes: (i) a tank containing fuel; (ii) a pump that is electronically controlled and configured to pressurize the fuel and provide pressurized fuel to an engine; (iii) an electro-mechanical valve disposed downstream from the pump and configured to control flow of the pressurized fuel to the engine; (iv) a mechanical shut-off valve disposed between the pump and the electro-mechanical valve, wherein the mechanical shut-off valve is normally-open and is configured to close to shut-off the flow of the pressurized fuel when a pressure difference thereacross exceeds a threshold pressure difference; and (v) a controller configured to perform operations prior to turning on the engine, the operations. The operations comprise: (i) sending a signal to open the electro-mechanical valve, (ii) receiving, from a pressure sensor, pressure information indicative of a pressure level of the pressurized fuel between the electro-mechanical valve and the engine, (iii) determining, based on the pressure information, that the pressure level failed to increase upon sending the signal, (iv) based on the pressure level failing to increase, determining that the mechanical shut-off valve is closed, and (v) in response to determining that the mechanical shut-off valve is closed, sending a cyclic signal to the electro-mechanical valve.

In an eighth example implementation, the present disclosure describes a non-transitory computer readable medium having stored therein instructions that, when executed by a controller, cause the controller to perform operations in accordance with the seventh example implementation. In a ninth example implementation, the present disclosure describes a method including operations in accordance with the seventh example implementation.

In a tenth example implementation, the present disclosure describes a system. The system includes: (i) a source of pressurized fluid; (ii) an electro-mechanical valve fluidly coupled to the source of pressurized fluid and configured to control flow of the pressurized fluid from the source to a device configured to consume the fluid; (iii) a pressure sensor configured to measure a pressure level of the pressurized fluid between the electro-mechanical valve and the device; (iv) one or more processors; (v) non-transitory data storage; and (vi) program instructions stored in the non-transitory data storage that, when executed by the one or more processors, cause the one or more processors to perform operations. The operations comprise: (i) receiving, from the pressure sensor, pressure information indicative of the pressure level, (ii) estimating a rate of change of the pressure level with respect to time, (iii) determining that the pressure information indicates a potential malfunction in the system based on the rate of change of the pressure level exceeding a predetermined threshold rate of change, and (iv) in response to determining that the pressure information indicates the potential malfunction, performing a predetermined action.

In an eleventh example implementation, the present disclosure describes a non-transitory computer readable medium having stored therein instructions that, when executed by a controller, cause the controller to perform operations in accordance with the tenth example implementation. In a twelfth example implementation, the present disclosure describes a method including operations in accordance with the tenth example implementation.

In a thirteenth example implementation, the present disclosure describes a system. The system includes: (i) a fuel supply pump configured to provide pressurized fuel; (ii) an electro-mechanical valve fluidly coupled to the fuel supply pump and configured to control flow of the pressurized fuel from the fuel supply pump to an engine; (iii) a pressure sensor configured to measure a pressure level of the pressurized fuel between the electro-mechanical valve and the engine; (iv) an oxygen sensor coupled to the engine, where the oxygen sensor is configured to indicate a performance level of the engine; (v) a controller; (vi) non-transitory data storage; and (vii) program instructions stored in the non-transitory data storage that, when executed by the controller, cause the one or more processors to perform operations. The operations comprise: (i) receiving, from the pressure sensor, pressure information indicative of the pressure level, (ii) determining that the pressure information indicates a potential malfunction in the system, (iii) in response to determining that the pressure information indicates the potential malfunction, determining, based on oxygen information indicative of the performance level of the engine, that the performance level of the engine is less than a predetermined performance level of the engine, (iv) in response to determining that the performance level of the engine is less than the predetermined performance level of the engine, determining that a malfunction has occurred in the system, and (v) in response to determining that the malfunction has occurred in the system, performing a predetermined action.

In a fourteenth example implementation, the present disclosure describes a non-transitory computer readable medium having stored therein instructions that, when executed by a controller, cause the controller to perform operations in accordance with the thirteenth example implementation. In a fifteenth example implementation, the present disclosure describes a method including operations in accordance with the thirteenth example implementation.

In a sixteenth example implementation, the present disclosure describes a method. The method includes: (i) receiving, at a controller from a pressure sensor, pressure information indicative of a pressure level of pressurized fuel in a fuel line between an electro-mechanical valve and an engine; (ii) determining that the pressure information indicates a potential malfunction associated with the fuel line; (iii) in response to determining that the pressure information indicates the potential malfunction, determining, based on oxygen information indicative of a performance level of the engine, that the performance level of the engine is less than a predetermined performance level of the engine; (iv) in response to determining that the performance level of the engine is less than the predetermined performance level of the engine, determining that a malfunction has occurred in the system; and (v) in response to determining that the malfunction has occurred in the system, performing a predetermined action.

In a seventeenth example implementation, the present disclosure describes a non-transitory computer readable medium having stored therein instructions that, when executed by a controller, cause the controller to perform operations in accordance with the sixteenth example implementation.

The foregoing summary is illustrative only and is not intended to be in any way limiting. In addition to the illustrative aspects, implementations, and features described above, further aspects, implementations, and features will become apparent by reference to the figures and the following detailed description.

DETAILED DESCRIPTION

The following detailed description describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

I. Overview

Figure 1:
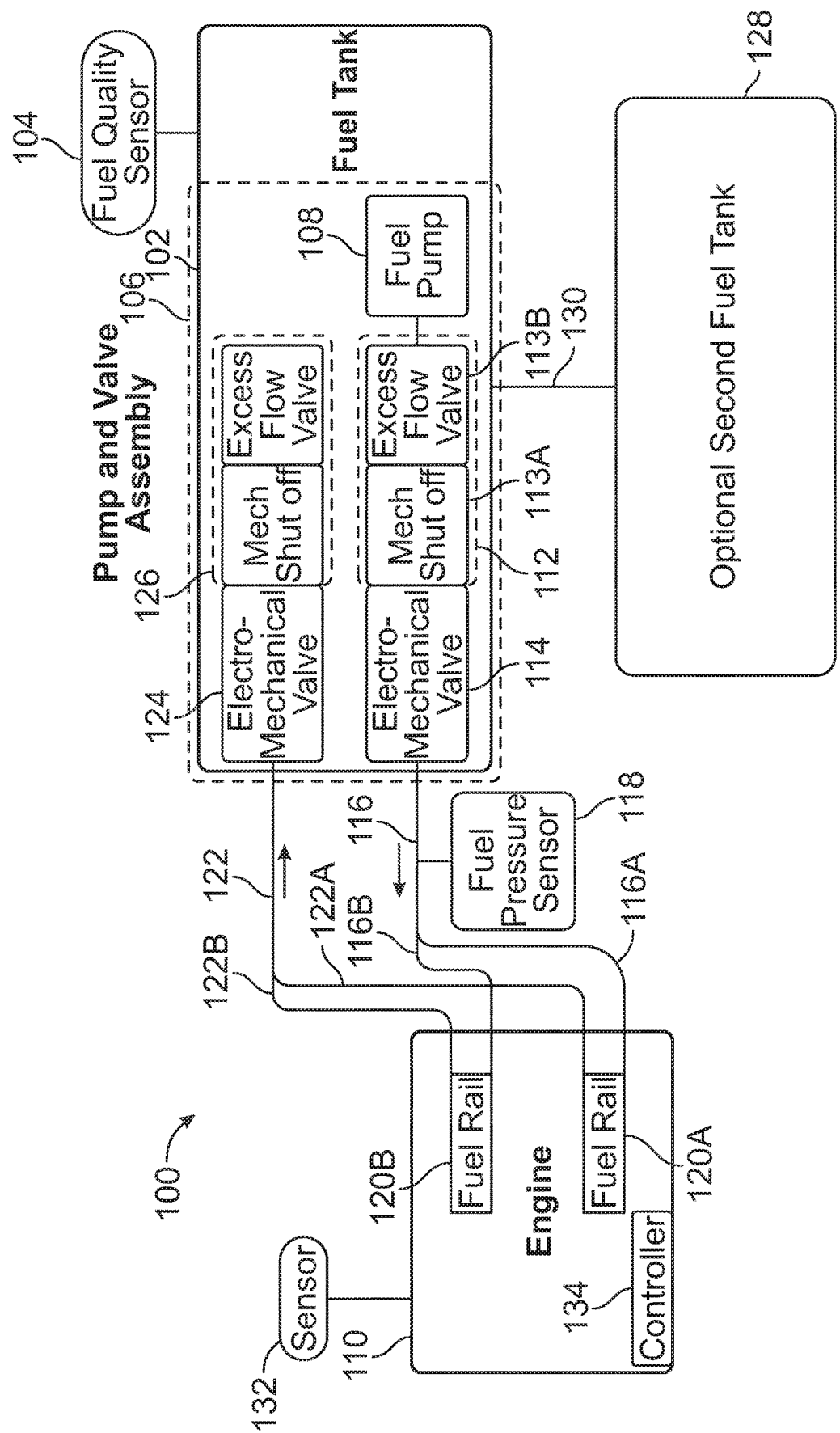
FIG. 1 illustrates a block diagram of a fuel system for liquid propone, in accordance with an example implementation.

FIG. 1 illustrates a block diagram of a fuel system 100 for liquid propone (LP), in accordance with an example implementation. The fuel system 100 includes a tank 102 that contains pressurized LP. A fuel quality sensor 104 may be coupled to the tank 102. For instance, the fuel quality sensor 104 may be located at a bottom of the tank 102 or may be coupled to a fuel hose. LP gas is a combination of propane and butane fuels and these two fuels have different boiling points and combustion characteristics. The fuel quality sensor 104 may be configured to provide to a controller of the fuel system 100 information indicative of percentages of butane and propane in the tank 102. Based on the information from the fuel quality sensor 104, the controller can adjust fueling rates and spark timing of an engine.

The tank 102 may include a pump and valve assembly 106. The pump and valve assembly 106 includes a supply pump 108 that is electronically controlled and configured to draw LP from the tank 102 and pressurize it to provide pressurized LP to an engine 110.

The pump and valve assembly 106 controls flow of the pressurized LP from the supply pump 108 to the engine 110. For example, mechanical valves 112 may be disposed downstream from the supply pump 108. The mechanical valves 112 may include a mechanical shut-off valve 113A and an excess flow valve 113B. The mechanical shut-off valve 113A and the excess flow valve 113B are collectively referred to herein as the mechanical valves 112 and are configured to provide a normally-open path for LP. The mechanical shut-off valve 113A may be used by a servicing technician for example to ensure that no propane leakage occurs. For instance, the mechanical shut-off valve 113A may comprise a thumb wheel or knob that can adjusted by a technician to preclude leakage.

The excess flow valve 113B is normally-open to allow flow of pressurized LP to the engine 110, but is configured to close if a pressure difference thereacross exceeds a threshold pressure difference. As an example, the excess flow valve 113B may include a spring-loaded check valve. The spring-loaded check valve may allow flow therethrough unless a pressure difference thereacross overcomes a spring force of the spring-loaded check valve. When the pressure difference thereacross overcomes the spring force, a check element (e.g., a ball or a poppet) is forced to seat on a valve seat to shut-off flow through the excess flow valve 113B.

Further, an electro-mechanical valve 114 may be disposed downstream from, and is fluidly coupled to, the mechanical valves 112. In examples, the electro-mechanical valve 114 may be any type of electronically-controlled valve. For example, the electro-mechanical valve 114 could include a two-way poppet or spool valve that is controlled by a solenoid actuatable by an electric signal.

In an example, when the electro-mechanical valve 114 is actuated via an electric signal, it opens and LP is allowed to flow through a fuel supply line 116 to the engine 110. If the electro-mechanical valve 114 is not actuated, it remains in a closed state and no fuel is allowed to flow to the engine 110.

A sensor 118 may be coupled to the fuel supply line 116. The sensor 118 may be configured to provide pressure and temperature information indicative of a pressure level and temperature of the LP flowing through the fuel supply line 116.

The fuel supply line 116 may branch off into a branch fuel supply line 116A to communicate the pressurized LP to a first fuel rail 120A, and a branch fuel supply line 116B to communicate the pressurized LP to a second fuel rail 120B. The fuel rails 120A and 120B provide the pressurized LP to injectors configured to inject it to respective cylinders of the engine 110.

Return lines 122A and 122B couple the fuel rails 120A and 120B, respectively, to a common return line 122 connected to the tank 102. With this configuration, excess LP that is not consumed by the engine 110 may be returned back to the tank 102 via the return lines 122A and 122B. The pump and valve assembly 106 may include another electro-mechanical valve 124 and mechanical valves 126 (e.g., a mechanical shut-off valve and excess flow valve combination). The electro-mechanical valve 124 may be similar in operation to the electro-mechanical valve 114, and the mechanical valves 126 may be similar in operation to the mechanical valves 112. The electro-mechanical valve 124 and the mechanical valves 126 control flow of LP back to the tank 102.

In examples, the pump and valve assembly 106 may be located outside the tank 102 and coupled thereto via a fuel line. Also, in some examples, the fuel system 100 may include an optional second fuel tank 128 coupled to the tank 102 via a fuel line 130.

When the engine 110 is running, a sensor 132 may be configured to provide information indicative of oxygen concentration in the exhaust gases generated by the engine 110. In examples, the sensor 132 may be an oxygen sensor or a combination of an oxygen sensor and an air flow sensor configured to provide information indicative of air-to-fuel ratio. This information may thus indicate whether the engine 110 is running "lean" or "rich."

The fuel system 100 may also have a controller 134. The controller 134 may include one or more processors and a computer-readable medium (CRM). Any processor of the one or more processors can include a general purpose processor (e.g., an INTEL® single core microprocessor or an INTEL® multicore microprocessor), or a special purpose processor (e.g., a digital signal processor, a graphics processor, or an application specific integrated circuit (ASIC) processor). A processor can be configured to execute computer-readable program instructions (CRPI). A processor can be configured to execute hard-coded functionality in addition to or as an alternative to software-coded functionality (e.g., via CRPI). The at least one processor of the one or more processors can be programmed to perform any function or combination of functions described herein as being performed by the controller 134.

The CRM could include a non-transitory computer-readable medium, a transitory computer-readable medium, or both a non-transitory computer-readable medium and a transitory computer-readable medium. In one respect, a non-transitory computer-readable medium could be integrated in whole or in part with a processor of the one or more processors. In another respect, a non-transitory computer-readable medium, or a portion thereof, could be separate and distinct from a processor.

A non-transitory computer-readable medium could include, for example, a volatile or non-volatile storage component, such as an optical, magnetic, organic or other memory or disc storage. Additionally or alternatively, a non-transitory computer-readable medium could include, for example, a random-access memory (RAM), a read-only memory (ROM), a programmable read-only memory (PROM), an erasable programmable read-only memory (EPROM), an electrically erasable programmable read-only memory (EEPROM), a compact disk read-only memory (CD-ROM), or another memory device that is configured to provide data or CRPI to a processor.

The controller 134 may be configured to receive signals from the various sensors (e.g., the sensors 104, 118, and 132) in the fuel system 100 and may accordingly control the supply pump 108 and the electro-mechanical valves 114 and 124 so as to control operation of the fuel system 100. The controller 134 may be a standalone controller or may be combined with an engine control unit. Signal lines to and from the controller 134 are not shown in FIG. 1 to reduce visual clutter in the drawing.

In examples, the fuel system 100 may include other components that are not shown to reduce visual clutter in the drawings. For example, the fuel system 100 may include a pressure relief valve that protects the fuel system 100 from pressure surges that exceeds a threshold pressure level. The fuel system 100 may also include fuel filters, overfill protection valves, check valves, a tank fuel level sensor, a scavenge pump in the tank 102, among other components. Further, some of the components described above may be eliminated or combined. As an example, the mechanical valves 112 and 126 may be removed from the fuel system 100, and the electro-mechanical valves 114 and 124 may be configured to perform their functions.

Malfunctions (e.g., failures) could occur in the fuel system 100. For example, the fuel supply line 116 could be severed. In another example, leakage of fuel could occur due to deterioration of a fuel line or other components of the fuel system 100. In another example, a component (e.g., a valve) may fail. These malfunctions may be hazardous, and therefore, it may be desirable to monitor performance of the fuel system 100 and be able to detect leakages or malfunctions and accordingly take remedial actions.

It is also desirable to be able to monitor the fuel system 100, not only while the engine 110 is running, but also prior to running the engine 110 to detect any malfunctions and report them prior to operating the engine 110. Disclosed herein are systems and methods to monitor the fuel system 100 both while the engine 110 is running and prior to running the engine 110. The disclosed systems and methods are for detecting malfunctions and taking corresponding remedial actions to reduce risks and hazards.

II. Example Monitoring Systems During Operation of an Engine

Figure 2:
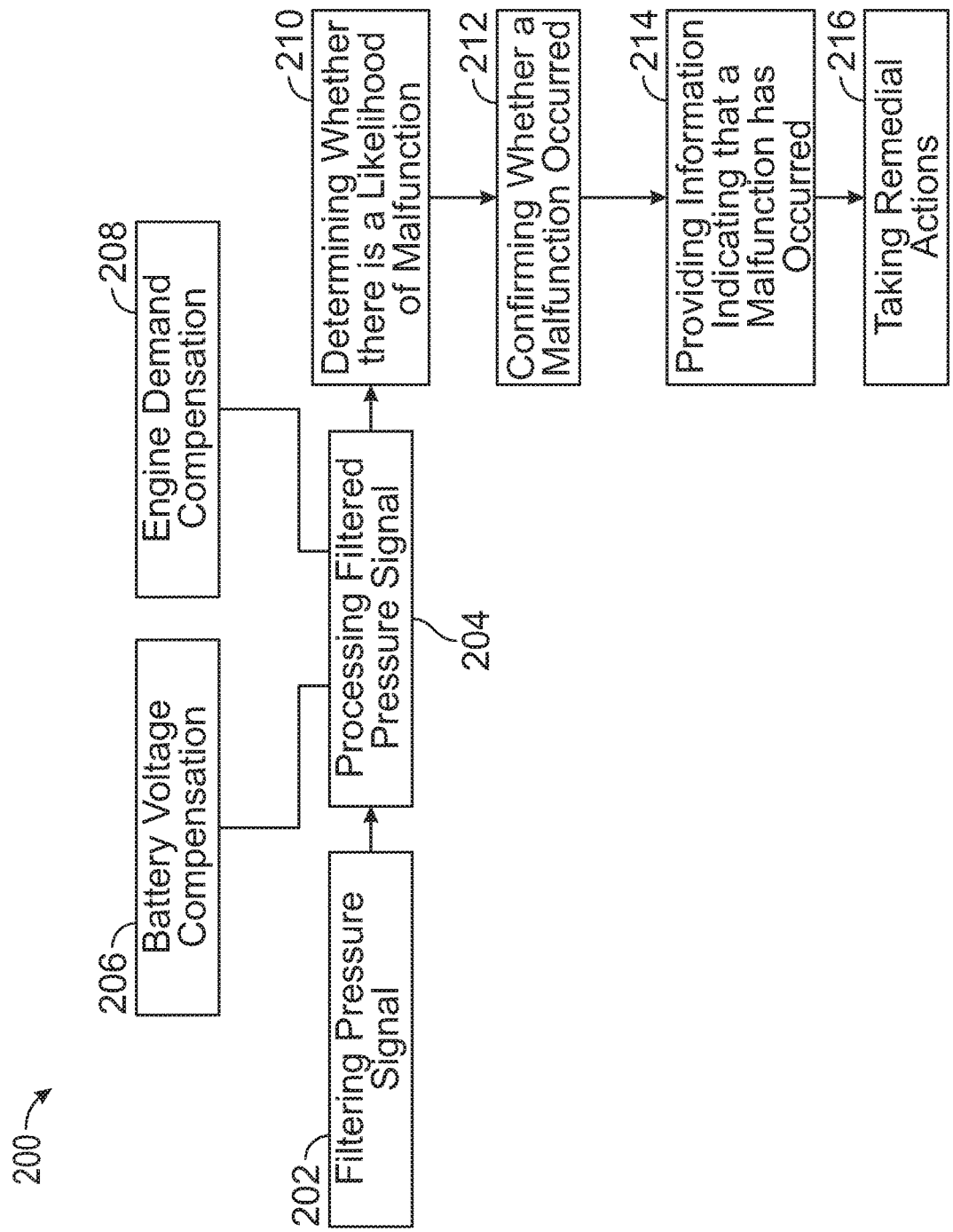
FIG. 2 illustrates a block diagram of operations related to monitoring a fuel system while an engine is running, in accordance with an example implementation.

FIG. 2 illustrates a block diagram 200 of operations related to monitoring the fuel system 100 while the engine 110 is running, in accordance with an example implementation. The operations depicted in FIG. 2 could, for example, be implemented by the controller 134.

At block 202, the controller 134 receives, from the sensor 118, a signal indicative of the pressure level of the fuel in the fuel supply line 116, and then filters the signal. The controller 134 may, for example, implement a digital filter (e.g., a low pass filter, band pass filter, or any other type of filter) to remove undesirable frequencies from the raw signal received from the sensor 118. For instance, the digital filter could be a low pass filter that removes high frequency changes (e.g., sensor noise) in the signal received from the sensor 118. As such, the filtered signal resulting from the filter may include slow changes in the pressure level that could facilitate determining whether the pressure changes have resulted from a particular event such as a malfunction or leakage.

In an example, the controller 134 may implement multiple filters in series, such as a low pass filter, a high pass filter, a band pass filter, a notch filter, etc. Each filter could be used to remove frequencies or frequency ranges that are not associated with malfunctions. The signal resulting from the series of filters is a first filtered signal. In this example, another low pass filter could be implemented in parallel with the series of filters. This other low pass filter may be used to remove high frequency electrical and system noise from the raw signal received from the sensor 118 to generate a second filtered signal.

At block 204, the controller 134 processes the filtered pressure signal to generate a processed signal that could be used to determine whether the system is operating properly or whether there is a likelihood of malfunction or leakage. For example, the controller 134 may estimate a rate of change of the pressure level with respect to time (e.g., a time derivative of the filtered pressure signal).

In examples, to estimate the rate of change of the pressure level, the controller 134 may subtract the first filtered signal of the above-mentioned series of filters from the second filtered signal of the low pass filter. The subtraction value resulting may be considered an approximation of the rate of change of the pressure level.

In another example, processing the filtered pressure signal (e.g., the filtered signal resulting from a low pass filter) may involve determining a moving average value of the pressure level over time. The controller 134 may also determine a standard deviation value for the moving average for subsequent comparison therebetween.

In another example, processing the filtered pressure signal (e.g., the filtered signal resulting from a low pass filter) may involve the controller 134 determining a Fast Fourier Transform (FFT) for the filtered pressure signal in the frequency domain. The controller 134 may then remove undesired frequencies from the FFT. Other processing techniques could be used as well.

At block 206, the controller 134 may adjust the processed pressure level signal to make up for variation of voltage of a battery configured to power the supply pump 108. For example, if the supply pump 108 is commanded to provide fuel at a high pressure level, a proportionally high voltage may be supplied by the battery to the supply pump 108. For instance, the higher the voltage, the faster the rotational speed of the supply pump 108, and the higher the pressure level of the pressurized fuel discharged by the supply pump 108. The controller 134 may have access to a look-up table that includes adjustment or compensation values that the controller 134 may add to subtract from the processed signal (e.g., resulting from the low pass filter) based on the voltage provided to the supply pump 108.

By compensating for battery voltage variation, the controller 134 may normalize the pressure levels prior to determining a likelihood of malfunction in the fuel system 100. For example, if the pressure level drops suddenly due to a reduction in the battery voltage and rotational speed of the supply pump 108, the controller 134 may adjust the pressure level signal to distinguish between such a drop in pressure and a pressure drop resulting from a malfunction (e.g., leakage).

In addition, or alternative, to adjusting the processed pressure signal to compensate for battery voltage variation, at block 208, the controller 134 may adjust the processed pressure signal to compensate for variation in demand by the engine 110. Particularly, if demand on the engine 110 (e.g., a torque demand while climbing a hilly road) increases, the duty cycle of the injectors of the engine 110 may increase to match the demand. This increase in the duty cycle may lead to an increase in consumption of the fuel delivered through the fuel supply line 116. Such increase in consumption in turn may cause a decrease in the pressure level in the fuel supply line 116. The controller 134 may adjust the processed pressure signal to distinguish between a decrease in pressure resulting from an increase in engine demand and a drop in pressure resulting from a malfunction. This way, the controller 134 may compensate for the engine demand and normalize the processed pressure signal.

At block 210, the controller 134 determines whether there is likelihood of malfunction in the fuel system 100 based on the processed and compensated pressure level signal. As mentioned above, the controller 134 may process the pressure signal to determine one or more of: (i) an estimate of a rate of change of the pressure level, (ii) an approximation of the rate of change by subtracting the first filtered signal of the series of filters from the second filtered signal of the low pass filter, (iii) a moving average value and a standard deviation for the moving average, or (iv) an FFT signal for the filtered pressure signal. The controller 134 may then use the processed pressure signal to determine whether there is a likelihood of malfunction.

As an example, by estimating the rate of change of the pressure level in the fuel supply line 116, the controller 134 may determine whether the fuel supply line 116 severed or is leaking. For instance, a negative rate of change that exceeds a predetermined threshold (e.g., a pressure drop of 15-25 pounds per square inches (psi) per second) may indicate a rapid drop in the pressure level. Such rapid drop in the pressure level could occur as a result of severing the fuel supply line 116 or a large leakage that caused the pressure level to drop rapidly.

In another example, the controller 134 may compare the subtraction value of the first filtered signal of the series of filters from the second filtered signal of the low pass filter to multiple threshold pressure values. One threshold value may be associated with a large leakage in the fuel system 100 (e.g., the threshold value may be about 30-40 psi). Another threshold value may be associated with a malfunction in the supply pump 108 (e.g., the threshold value may be about 50-60 psi).

Another threshold value may be associated with the excess flow valve 113B "tripping," e.g., closing due to a sudden increase in the pressure difference thereacross. As an example when the excess flow valve trips or closes, the pressure at the supply pump 108 may spike to about 100-125 psi, but at the sensor, 118, the pressure may drop by about 50-60 psi. This sudden increase in the pressure difference across the excess flow valve 113B may occur, for example, if the fuel supply line 116 is severed. Particularly, if the fuel supply line 116 is severed, the pressure downstream from the excess flow valve 113B may drop to a value close to atmospheric pressure, while the pressure upstream therefrom could be supply pressure provided by the supply pump 108. The difference between the pressure levels upstream and downstream may cause the excess flow valve 113B to trip if the pressure difference exceeds a particular threshold value (e.g., 50-75 psi).

In another example, the controller 134 may compare the standard deviation value of the moving average of the pressure signal to the moving average. If the standard deviation value differs from the moving average by a threshold value (e.g., differ by about 10-20% of the moving average), then a malfunction or leakage might have occurred.

In another example, the controller 134 may compare the frequencies in the FFT of the filtered pressure signal to predetermined frequency bins that correspond to malfunctions such as leakage, tripping of the excess flow valve 113B, or malfunction of the supply pump 108. If a frequency in the FFT matches or falls within a particular frequency bin, then a corresponding malfunction might have occurred The above-described processing techniques are examples for illustration only. These techniques could be used individually or in combination. Other processing techniques could be used to determine whether there is a likelihood of malfunction based on the signal indicating the pressure level in the fuel supply line 116.

In some examples, the pressure information may be used with other information to determine or confirm that a malfunction has occurred. As an example, the pressure information may indicate that there is a likelihood that a malfunction has occurred, and such indication may then trigger the controller 134 to perform other operations to confirm that a malfunction has occurred.

At block 212, the controller 134 confirms that a malfunction has occurred in response to the pressure information indicating that there is a likelihood of malfunction. For example, the pressure information may indicate at block 210 that there is a pressure drop or a rate of change of pressure that exceeds a threshold value. Exceeding the threshold value may in turn indicate that the fuel supply line 116 is severed or that there is a leakage therefrom causing the pressure therein to drop. If the fuel supply line 116 is severed or a leakage occurred, then the engine 110 might not receive a sufficient amount of fuel through the fuel supply line 116. In this case, a ratio between fuel and oxygen in a fuel mixture being burnt by the engine 110 may fall below a particular threshold ratio and the engine 110 runs "lean."

Thus, as a confirmation that a malfunction has occurred, the controller 134 may receive oxygen concentration information from the sensor 132 to determine whether the fuel-to-oxygen ratio decreased (e.g., whether the engine 110 is running lean). The controller 134 may also have information related to an amount of fuel that is expected to be provided to the engine 110 given, for example, a voltage provided to the supply pump 108. If the fuel-to-oxygen ratio decreased compared to what is expected, then the controller 134 may determine that not all the fuel produced by the fuel supply pump reaches the engine and may therefore confirm that a malfunction has occurred. If the ratio does not decrease, or the ratio stays within a normal range of change, then the controller 134 may determine that the pressure information indicates a false positive and that no malfunction has occurred.

Figure 3:
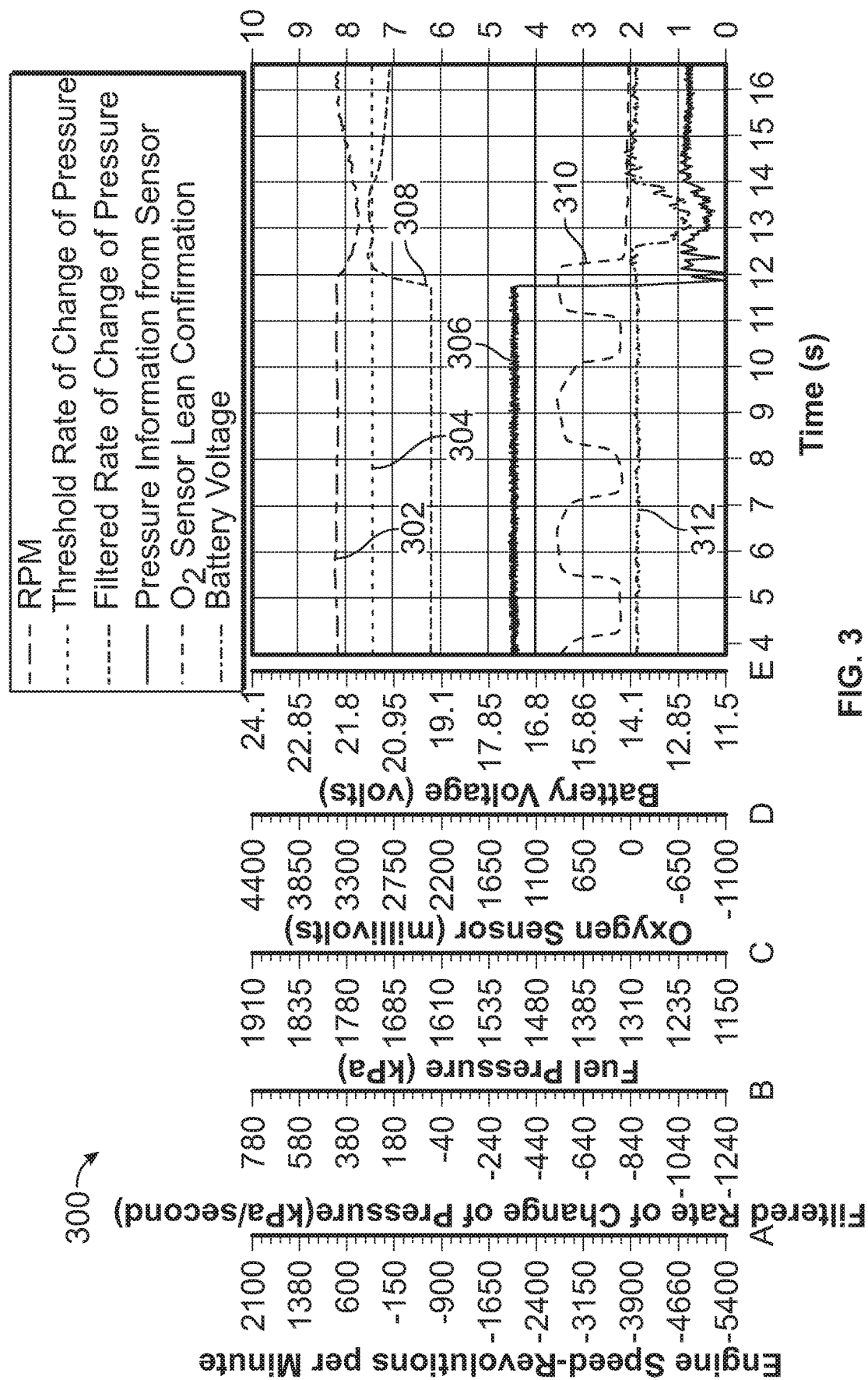
FIG. 3 is a graph showing experimental results of pressure and fuel-to-oxygen ratio variation over time indicating a malfunction, in accordance with an example implementation.

FIG. 3 is a graph 300 showing experimental results of pressure and fuel-to-oxygen ratio variation over time indicating a malfunction, in accordance with an example implementation. The x-axis of the graph 300 shows time in seconds. The y-axis shows (i) engine rotations per minute (rpm), (ii) filtered rate of change of pressure values (kilo Pascal (kPa)/second), (iii) fuel pressure (kPa), (iv) oxygen sensor information (millivolts), and (v) battery voltage of the supply pump 108 (volts).

As depicted in FIG. 3, line 302 illustrates engine rpm, line 304 is a straight horizontal line representing a threshold rate of change of pressure associated with a particular malfunction. For example, the threshold rate of change of pressure may be a value between 15 and 25 psi (i.e., between 103 and 172 kPa) in less than 1 second. As a particular example, as depicted in FIG. 3, the threshold rate of change in pressure may be about 240 kPa/second, which is a change of 172 kPa in about 0.7 seconds. These values are examples for illustration only, and other values could be used.

Line 306 represents the pressure level indicated by the pressure information received from the sensor 118. Further, line 308 represents a magnitude of an estimated rate of change of pressure after filtering the pressure signal represented by the line 306. Line 310 represents oxygen sensor information received at the controller 134 from the sensor 132, which may indicate the amount of oxygen in the exhaust gas). Line 312 represents voltage provided by the controller 134 to the supply pump 108.

As shown, at a time $t_1 \cong 11.8$ seconds, the pressure level represented by the line 306 drops rapidly and settles over time at a value less than a value of pressure prior to $t_1$. Also, at after $t_1$, the line 308 shows a rapid increase in a magnitude of the estimated rate of change of the pressure level. At $t_2 \cong 12.3$ seconds, the magnitude of the estimated rate of change exceeds the threshold rate of change represented by the line 304.

Thus, at $t_2$, the controller 134 may determine that there is a likelihood of malfunction (e.g., the fuel supply line 116 is severed) indicated by the rapid increase of the magnitude of the rate of change, which exceeded the threshold rate of change. To confirm that a malfunction has occurred, the controller 134 may also receive and analyze the oxygen sensor information indicate by the line 310. The oxygen sensor information indicates that at $t_2$ the fuel-to-oxygen ratio decreased and remained at a low value thereafter without increasing again. This behavior may indicate that the engine 110 is running lean. As such, the controller 134 confirms that a malfunction occurred (e.g., the fuel supply line 116 is severed or that a leakage occurred causing the pressure level to drop and the engine 110 to run lean because the fuel is being delivered thereto is not sufficient).

The battery voltage represented by the line 312 may preclude the controller 134 from falsely flagging a fuel system fault due to a voltage problem. In particular, if the battery voltage drops, such as when an alternator fails, the supply pump 108 may slow down and the fuel pressure level may drop. Referring the battery voltage (indicated by the line 312), the controller 134 may thus distinguish whether a drop in battery voltage is due to a battery or alternator problem or is due to a malfunction in the fuel system 100.

Referring back to FIG. 2, at block 214, if the controller 134 confirms that a malfunction has occurred, the controller 134 provides information indicative of the malfunction. For example, the controller 134 may cause a red lamp to light up in the dashboard of the vehicle so the driver can be informed of the malfunction. In an example, the controller 134 may generate a display of a message indicating the malfunction. In another example, the controller 134 may transmit the information wirelessly to a remote vehicle health monitoring location. The controller 134 may use other methods and transmission methods to transmit the malfunction information to various entities.

At block 216, the controller 134 may take remedial and/or safety actions in response to the malfunction. As examples, the controller may take any or a combination of the following actions: (i) turn off the supply pump 108, (ii) inhibit cranking the engine 110, (iii) prevent spark plugs from firing, or (iv) shut-off the electro-mechanical valve 114 to reduce or prevent flow of fuel to the engine 110 to preclude further fuel leakage. In examples, the controller 134 may wait for a predetermined period of time (e.g., 6-10 seconds) and then take remedial and safety actions to prevent a fire or accident hazard.

In examples, the electro-mechanical valve 124 may include a solenoid valve having a spring-loaded element. The spring-loaded element may cause a flow restriction that provides additional back pressure, thereby raising fuel pressure in the return line 122 to a desired value that facilitates efficient and proper operation of the injectors of the engine 110.

Although the description above uses a fuel system of a vehicle to illustrate the operations, the above described operations could be used for any fuel or gas distribution system. For example, the operations could be used to monitor any LP or natural gas distribution system. In this example, the system may include any type of a source of pressurized fluid (e.g., pump, accumulators, etc.) configured to pressurize and provide fluid through a network to any type of a device that consumes the fluid (e.g., a home appliance). Such system may include some of the component described in the fuel system 100 such as the electro-mechanical valve 114 and the mechanical valves 112.

Figure 4:
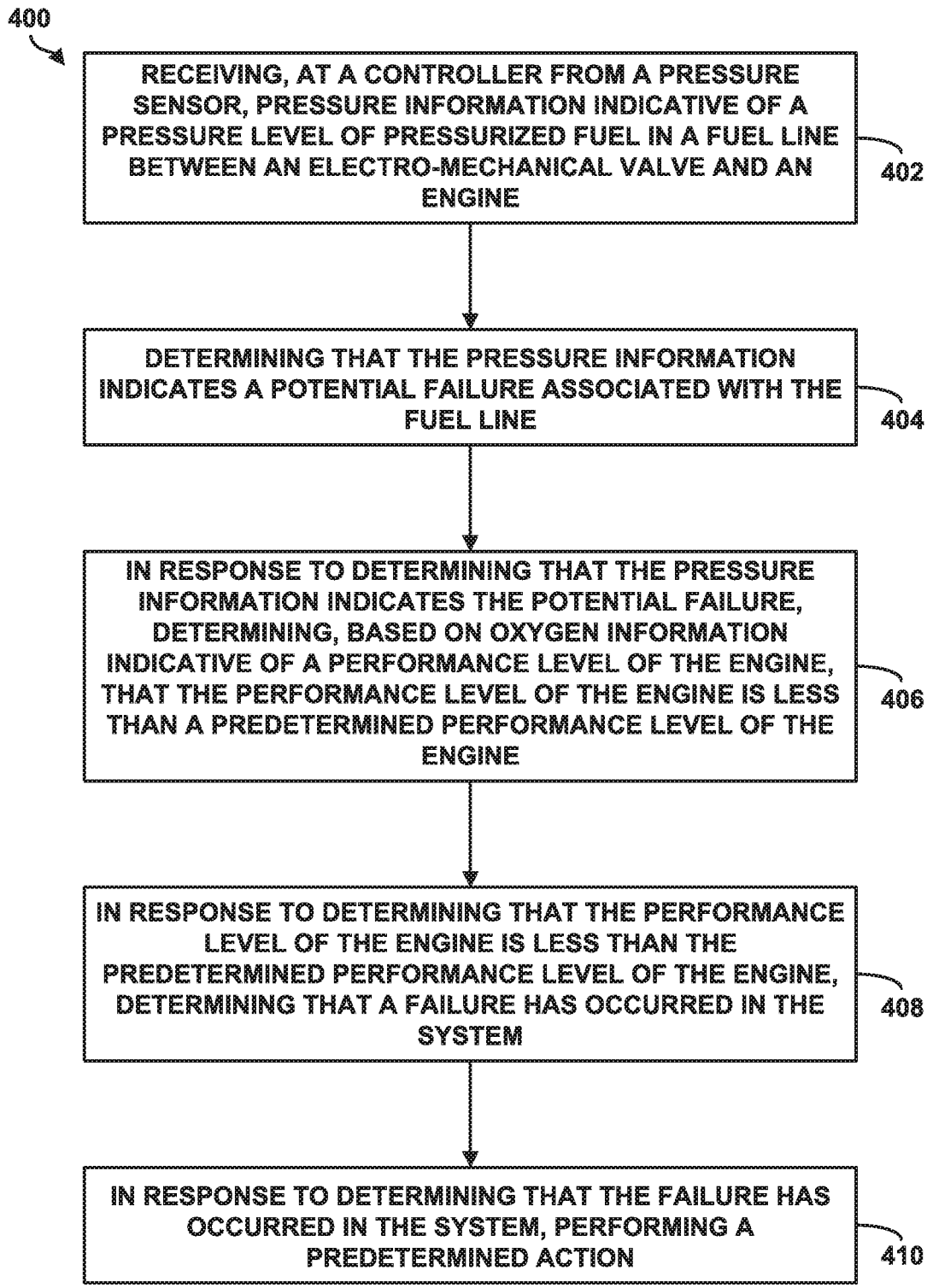
FIG. 4 is a flow chart of a method for monitoring a fuel system of a vehicle during engine operation, in accordance with an example implementation.

FIG. 4 is a flow chart 400 of a method for monitoring a fuel system of a vehicle during engine operation, in accordance with an example implementation. The operations illustrated in the flow chart 400 could be performed, for example, by the controller 134 of the fuel system 100.

The flow chart 400 may include one or more operations, or actions as illustrated by one or more of blocks 402-410. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the flow chart 400 and other processes and operations disclosed herein, the flow chart 400 shows operations of one possible implementation of present examples. In this regard, each block may represent a module, a segment, or a portion of program code, which includes one or more instructions executable by the controller 134 for implementing specific logical operations or steps in the process. The program code may be stored on any type of computer readable medium or memory, for example, such as a storage device including a disk or hard drive. The computer readable medium may include a non-transitory computer readable medium or memory, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example. In addition, for the flow chart 400 and other processes and operations disclosed herein, one or more blocks in FIG. 4 may represent circuitry or digital logic that is arranged to perform the specific logical operations in the process.

At block 402, the flow chart 400 includes receiving, at a controller from a pressure sensor, pressure information indicative of a pressure level of pressurized fuel in a fuel line between an electro-mechanical valve and an engine. As mentioned above, the controller 134 may receive from the sensor 118 information indicative of a pressure level in the supply fuel lines such as the fuel supply line 116 connecting the electro-mechanical valve 114 to the engine 110.

The controller may then filter the pressure sensor signal received from the pressure sensor through one or more filters. For instance, the controller may use various filters such as a slow (e.g., low-sampling) low pass filter, a fast (e.g., high frequency sampling) filter or filters, band-pass filter, notch filter, or a combination thereof in series or parallel. This way, the controller may filter out frequencies from the pressure sensor signal that are not associated with a potential malfunction.

The controller may then process the filtered signal to estimate a rate of change of the pressure level, approximate the rate of change, determine a moving average for the pressure level and a standard deviation therefrom, determine an FFT of the pressure signal, or perform a combination of these processes. The controller may also modify the processed signal based on a magnitude of a command voltage signal provided to a fuel supply pump and/or commanded engine fuel demand.

At block 404, the flow chart 400 includes determining that the pressure information indicates a potential malfunction associated with the fuel line. As mentioned above with respect to block 210 in FIG. 2, the controller may use the processed signal and the parameters determined based thereon to determine whether there is a potential or a likelihood of malfunction. For example, if a magnitude of a rate of change of the pressure level exceeds a predetermined threshold, then the controller may determine that there is a likelihood of leakage or a fuel line being severed.

At block 406, the flow chart 400 includes, in response to determining that the pressure information indicates the potential malfunction, determining, based on oxygen information indicative of a performance level of the engine, that the performance level of the engine is less than a predetermined performance level of the engine. To confirm that a malfunction has occurred, the controller may obtain information from an oxygen sensor, a fuel-to-air ratio sensor, or a combination of both sensors. The information from the oxygen sensor or the fuel-to-air ratio sensor may indicate a performance level of the engine.

For instance, the information may indicate whether the engine is running lean where the fuel-to-air ratio is less than a threshold value, indicating that not enough fuel is provided to the engine. The controller may also have information related to an amount of fuel that is expected to be provided to the engine given, for example, a voltage provided to a fuel supply pump. Thus, the controller may determine that not all the fuel produced by the fuel supply pump reaches the engine.

At block 408, the flow chart 400 includes, in response to determining that the performance level of the engine is less than the predetermined performance level of the engine, determining that a malfunction has occurred in the system. For example, if the controller determines that the performance level of the engine is less than what is expected given the voltage provided to a fuel supply pump (e.g., the engine is running lean despite the fuel amount produced by the fuel supply pump), then the controller may confirm that malfunction has occurred. For example, a fuel supply line is leaking or has been severed.

At block 410, the flow chart 400 includes, in response to determining that the malfunction has occurred in the system, performing a predetermined action. In response to confirming that a malfunction has occurred, the controller may take remedial and safety actions to preclude any hazards. In an example, the controller may cause the electro-mechanical valve disposed between the pump and the engine to reduce or stop flow of the pressurized fluid from the fuel supply pump to the engine. In another example, the controller may cause the fuel supply pump to stop providing the pressurized fuel, e.g., the controller might not send an electric signal to the fuel supply pump. The controller may also send alert messages to the driver or other entities to indicate that a malfunction has occurred.

III. Example Monitoring Systems Prior To Operation of an Engine

It may be desirable to detect whether the fuel system 100 is safe to operate or whether a malfunction (e.g., leakage) has occurred prior to turning the engine 110 on. This way, any hazards that could result from turning the engine 110 on could be avoided.

Figure 5:
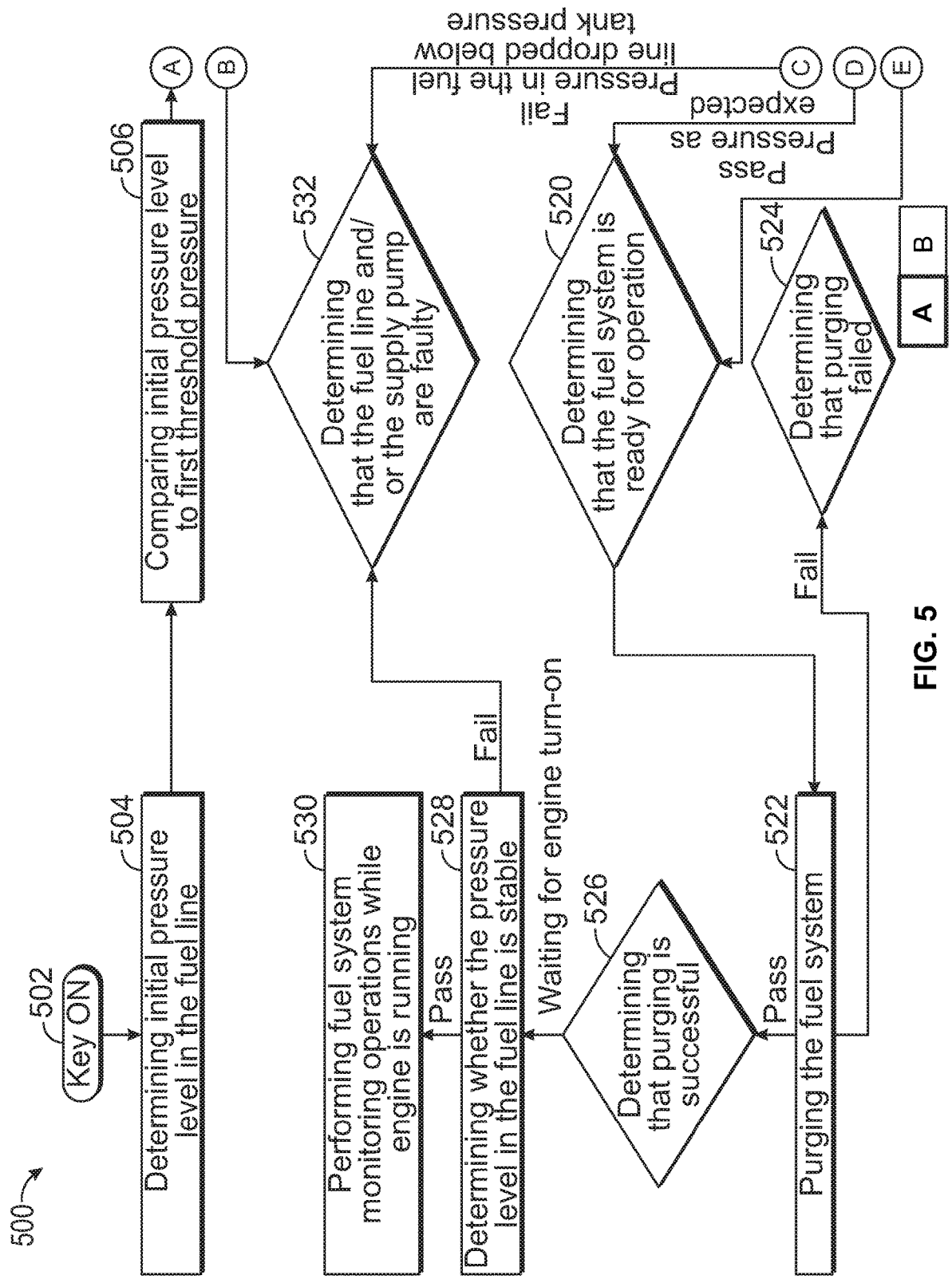
FIG. 5 illustrates a block diagram of operations related to determining whether a fuel system is ready for operation prior to running an engine, in accordance with an example implementation.
Figure 5:
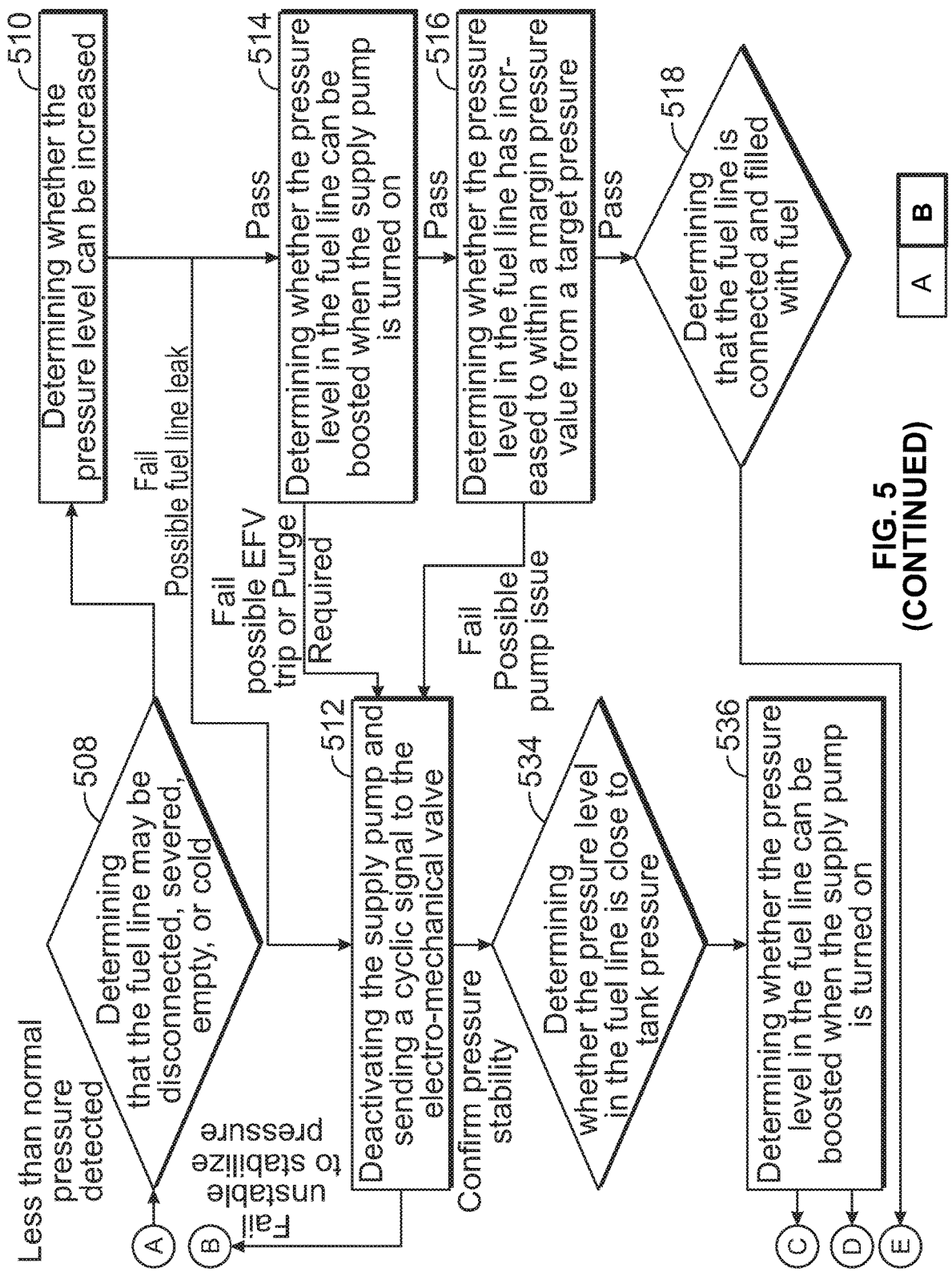

FIG. 5 illustrates a block diagram 500 of operations related to determining whether the fuel system 100 is ready for operation prior to running the engine 110, in accordance with an example implementation. The operations depicted in FIG. 5 could, for example, be implemented by the controller 134.

At block 502, the controller 134 may detect a key-on state where electric power is provided to the various systems of the vehicle, but the engine 110 is not yet running. The controller 134 may then perform operations to determine the state of the fuel system 100 and provide information regarding whether the engine 110 is ready for operation.

At block 504, with the supply pump 108 and the electro-mechanical valve 114 turned off (e.g., no signals are provided thereto), the controller 134 receives information from the sensor 118 to determine an initial pressure level in the fuel supply line 116.

At block 506, still with the supply pump 108 and the electro-mechanical valve 114 turned off, the controller 134 compares the initial pressure level in the fuel supply line 116 to a first threshold pressure level. As an example, in the key-on state, it might be expected that if the fuel system 100 is ready for operation, the pressure level of the fuel in the fuel supply line 116 may be about the pressure level in the tank 102, e.g., 1400 kPa. Thus, the controller 134 may compare the initial pressure level to a threshold pressure to determine a state of the fuel supply line 116. If the initial pressure level is above that threshold pressure level, then the fuel system 100 may be ready for operation. If the controller 134 determines that the initial pressure level is less than the threshold pressure, e.g., the initial pressure level is between 0-800 kPa, the controller 134 may perform further operations.

At block 508, based on the initial pressure level being less than a threshold pressure, the controller 134 determines that the fuel supply line 116 may be disconnected, severed, empty, or cold. The fuel supply line 116 could be empty, for example, after performance of maintenance where the lines were disconnected and reconnected again. In another example, if the vehicle is left non-operational for a period of time (e.g., more than a day), the pressure level in the fuel supply line 116 may decrease due to leakage flows in the various components (e.g., valves) of the fuel system 100. In this example, the fuel supply line 116 may be referred to as "cold."

At block 510, the controller 134 determines whether pressure level can be increased in the fuel supply line 116. Specifically, the controller 134 may send a first signal to the electro-mechanical valve 114 to open it. Pressurized fuel (e.g., pressure level of about 1400 kPa) may be trapped in the fuel lines connecting the supply pump 108 and the electro-mechanical valve 114. If the excess flow valve 113B is open, then upon sending the first signal to the electro-mechanical valve 114, the fuel trapped in the fuel lines connecting the supply pump 108 and the electro-mechanical valve 114 may flow through the fuel supply line 116. As a result, the pressure level in the fuel supply line 116 may start to increase.

If the pressure level does not increase to a second pressure threshold value (e.g., 1400 kPa), then a malfunction might have occurred. The malfunction could be, for example, a severed fuel supply line 116 or a leakage in the fuel supply line 116 that prevents building pressure therein. In this case, the excess flow valve 113B may trip (e.g., close), and the controller 134 may perform operations of block 512 described below.

If the pressure level builds and reaches the second pressure threshold value upon actuating the electro-mechanical valve 114, at block 514, the controller 134 determines whether the pressure level in the fuel supply line 116 can be boosted when the supply pump 108 is turned on or activated. As such, while the electro-mechanical valve 114 is turned on, the controller 134 sends a signal to the supply pump 108 to activate it and boost the pressure level. For example, when the supply pump 108 is turned on, the pressure level of the pressurized fuel produced thereby could be boosted to a pressure level of about 1900 kPa.

Thus, upon activating the supply pump 108 while the electro-mechanical valve 114 is turned on, the pressure level in the fuel supply line 116 is expected to be increased. The controller 134 may monitor the pressure sensor information received from the sensor 118 to determine whether the pressure level in the fuel supply line 116 has increased in response to turning the supply pump 108 on.

If the pressure level does not increase, then the controller 134 may determine that the excess flow valve 113B may have tripped, thus shutting off flow from the supply pump 108 to the fuel supply line 116. The excess flow valve 113B could trip because, for example, the pressure level downstream therefrom is lower than the pressure level upstream therefrom, which is generated by the supply pump 108.

For example, when the supply pump 108 is turned on, the pressure level between the supply pump 108 and the excess flow valve 113B (e.g., at an inlet port of the excess flow valve 113B) could increase rapidly. At the same time, the pressure level downstream at an outlet port of the excess flow valve 113B could be lower than pressure level at the inlet port by a threshold pressure (e.g., lower by more than 600 kPa or any other value determined by a spring rate of the excess flow valve 113B). Thus, the pressure difference across the excess flow valve 113B may cause it to close and shut off flow therethrough. In this case, the pressure level in the fuel supply line 116 might not increase. In response, the controller 134 may perform the operations associated with the block 512 described below.

However, if the pressure difference across the excess flow valve 113B is not sufficient to trip or close it, then the pressure level in the fuel supply line 116 may increase. At block 516, the controller 134 determines whether the pressure level in the fuel supply line 116 has increased to within a margin pressure value (e.g., 50 kPa) from a threshold or target pressure (e.g., 1900 kPa). The target pressure could be the rated output pressure of the supply pump 108 when activated, for example.

If the pressure level is increased to within the margin pressure value from the target pressure, the controller 134 may further be configured to wait for a predetermined amount of time (e.g., 5 seconds) to determine whether the pressure level is stable. For instance, the controller 134 may determine whether the pressure level stays within the margin pressure value from the target pressure for the predetermined amount of time.

If the controller 134 determines that the pressure level has not increased to within the margin pressure value from the target pressure, then the controller 134 might determine that the supply pump 108 or the excess flow valve 113B could possibly be faulty or that the excess flow valve 113B might be tripped. The controller 134 may then perform the operations associated with the block 512 described below. However, if the controller 134 determines that the pressure level has increased to within the margin pressure value from the target pressure, it then determines at block 518 that the fuel supply line 116 is connected and filled with fuel.

Consequently, the controller 134 may determine at block 520 that the fuel system 100 is ready for operation. However, prior to providing information to the driver that the engine 110 is ready to be turned on, the controller 134 may purge the fuel system 100 at block 522 so as to remove or clear out fuel vapor in the fuel lines 116, 116A, 116B, 122A, 122B, and 122 and the fuel rails 120A and 120B. Particularly, at the block 522, the controller 134 may send a first signal to turn the supply pump 108 on, send a second signal to turn the electro-mechanical valve 114 on, and a third signal to turn the electro-mechanical valve 124 on.

In this manner, the liquid fuel supplied by the supply pump 108 flows through the electro-mechanical valve 114 through the fuel supply lines 116, 116A and 116B to the fuel rails 120A and 120B. Because the engine 110 has not been turned on yet, the liquid fuel may then continue through the return lines 122A, 122B, and 122 and the electro-mechanical valve 124 back to the tank 102. The controller 134 may continue the purging operation for a predetermined amount of time (e.g., 10 seconds) to ensure removal of vapor in the fuel lines.

Further, while purging the fuel system 100, the controller 134 monitors the pressure level in the fuel supply line 116. If the pressure level drops below a threshold value or a magnitude of the rate of change of the pressure level reaches a particular value, the controller 134 determines at block 524 that the purging operation has failed. The controller 134 may then provide information indicating that the fuel system 100 and the engine 110 are not ready. For instance, the controller 134 may cause a red light to be turned on in a dashboard of the vehicle or may generate a display of a message on a display in the vehicle to indicate that the fuel system 100 and the engine 110 are not ready.

On the other hand, if the controller 134 determines that the pressure level in the fuel supply line 116 is stable during the purging operation, the controller 134 determines at block 526 that the purging operation has been successful. The controller 134 may then provide information indicating that the fuel system 100 and the engine 110 are ready for operation. For example, the controller 134 may cause a green light to turn on in the dashboard of the vehicle or may generate a display of a message on the display in the vehicle to indicate that the fuel system 100 and the engine 110 are ready. The controller 134 may then deactivate the supply pump 108 and the electro-mechanical valves 114 and 124, and thereafter wait for the engine 110 to be turned on (e.g., to be "cranked").

Upon receiving information that the engine 110 is being turned on (e.g., by receiving engine rpm information from a sensor), the controller 134 may activate the supply pump 108 and the electro-mechanical valves 114 and 124 to supply fuel to the engine 110. Then, at block 528, the controller 134 monitors the pressure level in the fuel supply line 116 via the sensor 118 to determine whether the pressure level is stable within a margin pressure value from the pressure level generated by the supply pump 108.

If the controller 134 determines that the pressure level is stable and within the margin pressure value from the pressure level generated by the supply pump 108, then at block 530 the controller 134 switches to performing the operations described above with respect to FIGS. 2-4 while the engine 110 is running. If not, at block 532, the controller 134 may determine that the fuel supply line 116 is severed or leaking, or that the supply pump 108 is faulty. The controller 134 may further provide a message or an indication to the driver that the fuel system 100 might not be operating properly.

Returning now to the block 512, as mentioned above, the controller 134 may perform the operations of the block 512 if the criterion associated with the blocks 510, 514, or 516 is not met. Specifically, if the controller 134 determines: (i) that the pressure level in the fuel supply line 116 does not increase to a pressure threshold value (e.g., 1400 kPa) at the block 510, (ii) that the pressure level has not increased when the supply pump 108 is turned on at the block 514, or (iii) that the pressure level has not increased to within the margin pressure value from the target pressure at the block 516, the controller 134 may execute the block 512.

At the block 512, the controller 134 deactivates the supply pump 108, and sends a cyclic signal to the electro-mechanical valve 114. In examples, the controller 134 may send the cyclic signal to both electro-mechanical valves 114 and 124. The cyclic signal could be for example, a sinusoidal or square waive. In an example, the cyclical signal may have a predetermined or adjustable frequency, duty cycle, and/or number of pulses. In another example, the controller 134 may cause the cyclic signal to last for a predetermined amount of time. In another example, the controller 134 may cause the cyclic signal to have a predetermined number of cycles.

The pressure level upstream from the excess flow valve 113B between the supply pump 108 (now deactivated) and the excess flow valve 113B is likely to be approximately (e.g., within a threshold value from) the pressure level in the tank 102 (e.g., 1400 kPa). The pressure level downstream between the excess flow valve 113B and the electro-mechanical valve 114 is likely less than the pressure level upstream from the excess flow valve 113B. Therefore, the pressure difference across the excess flow valve 113B may cause it to trip.

The pressure level downstream from the electro-mechanical valve 114 when it is closed may be higher than the pressure level between the excess flow valve 113B and the electro-mechanical valve 114. Thus, as the electro-mechanical valve 114 is cycled between an open and closed state via the cyclic signal sent thereto, the pressure level between the excess flow valve 113B and the electro-mechanical valve 114 may accordingly increase and build up with each cycle. Further, every time the electro-mechanical valve 114 closes, a shock wave may be sent through the fuel line between the excess flow valve 113B and the electro-mechanical valve 114 thus increasing the pressure level downstream from the excess flow valve 113B.

As a result, the excess flow valve 113B may also cycle between an open state and a closed state as the pressure difference thereacross fluctuates with each cycle of the cyclic signal sent to the electro-mechanical valve 114. Each time the excess flow valve 113B opens, even for a short amount of time, the pressure level downstream therefrom may increase and build up. The pressure level downstream from the excess flow valve 113B may keep building up as the electro-mechanical valve 114 is cycled. The pressure level may build up until it reaches a value such that the pressure difference across the excess flow valve 113B is not sufficient to trip it. As a result, the excess flow valve 113B may remain opened and recover from its tripped state.

Further, as the excess flow valve 113B and the electro-mechanical valve 114 are cycled between a closed state and an open state, the pressure level could also be building up in the fuel supply line 116 as fuel is communicated from the fuel line between the supply pump 108 and the excess flow valve 113B to the fuel supply line 116. The controller 134 may determine that the excess flow valve 113B recovered from a tripped state and is held open if the pressure level in the fuel supply line 116 is stable at a pressure level substantially equal (within a margin of pressure such as 10 kPa) from the pressure level in the tank 102.

The controller 134 may determine that the pressure level is stable by using any of the techniques discussed above with respect to block 210 in FIG. 2. Particularly, the controller 134 may estimate a rate of change of the pressure level in the fuel supply line 116 as the electro-mechanical valve 114 is cycled by the cyclic signal. When the estimated rate of change is below a threshold rate of change indicating that the pressure level is substantially constant (e.g., remains within a threshold value from a constant pressure level), then the controller 134 determines that the pressure level is stable.

In examples, the fuel system 100 may include another sensor configured to measure pressure level in the tank 102 and provide information indicative of the measurement to the controller 134. The controller 134 may then compare the pressure level indicated by the sensor 118 and the pressure level in the tank 102 to determine whether the two pressure levels are substantially equal.

In another example, the controller 134 may be configured to estimate the pressure level in the tank 102 by using the sensor 118 and the fuel quality sensor 104. Particularly, the fuel quality sensor 104 may provide to the controller 134 information indicating percentages of butane and propane in the LP fuel. At the same time, the sensor 118 may be configured to provide information indicative of a temperature as well as the pressure level of the fuel in the fuel supply line 116. The Combined Gas Law or General Gas Equation defines a specific relationship between evaporation pressure of a propane-butane mixture and: (i) the percentages of propane and butane in the mixture, and (ii) the temperature of the mixture. The controller 134 may have access to look-up tables that define such relationship.

Thus, by receiving information indicating the percentages of butane and propane in the fuel mixture as well as the temperature of the mixture, the controller 134 may use the look-up tables to determine the corresponding pressure level in the tank 102. Upon estimating the pressure level in the tank 102, the controller 134 may compare the pressure level indicated by the sensor 118 and the estimated pressure level in the tank 102 to determine whether the two pressure levels are substantially equal.

If the controller 134 determines that the pressure level is stable and substantially equal to the pressure level in tank 102, at block 536 the controller determines whether the pressure level in the fuel supply line 116 can be boosted when the supply pump 108 is turned on or activated. As such, while the electro-mechanical valve 114 is turned on, the controller 134 sends a signal to the supply pump 108 to activate it and boost the pressure level and also sends a signal to the electro-mechanical valve 124.

If the fuel supply line 116 is not severed or leaking, upon activating the supply pump 108, the pressure level in the fuel supply line 116 increases. The controller 134 may monitor the pressure sensor information received from the sensor 118 to determine whether the pressure level in the fuel supply line 116 has increased in response to turning the supply pump 108 and the electro-mechanical valves 114 and 124 on.

If the pressure level in the fuel supply line 116 increases to the expected boost pressure of the supply pump 108 and remains stable for a period of time, at block 520 as mentioned above, the controller 134 determines that the fuel system 100 is ready for operation. The controller 134 may then initiate purging the fuel the fuel system 100 at block 522 as described above.

If the controller 134 determines that the pressure level in the fuel supply line 116 is stable during the purging operation, the controller 134 determines at the block 526 that the purging operation has been successful. The controller 134 may then provide information indicating that the fuel system 100 and the engine 110 are ready for operation. The controller 134 may then deactivate the supply pump 108 and the electro-mechanical valves 114 and 124, and thereafter wait for the engine 110 to be turned on.

Upon receiving information that the engine 110 is turned on (e.g., by receiving engine rpm information from a sensor), the controller 134 may activate supply pump 108 and the electro-mechanical valves 114 and 124 to supply fuel to the engine 110. Then, at the block 528, the controller 134 monitors the pressure level in the fuel supply line 116 via the sensor 118 to determine whether the pressure level is stable and a margin pressure value from the pressure level generated by the supply pump 108. If the controller 134 determines that the pressure level is stable and within the margin pressure value from the pressure level generated by the supply pump 108, then at the block 530 the controller 134 switches to performing the operations described above with respect to FIGS. 2-4 while the engine 110 is running. If not, at the block 532, the controller 134 may determine that the fuel supply line 116 is severed or leaking, or that the supply pump 108 is faulty. The controller 134 may further provide a message or an indication to the driver that the fuel system 100 might not be operating properly.

Figure 6:
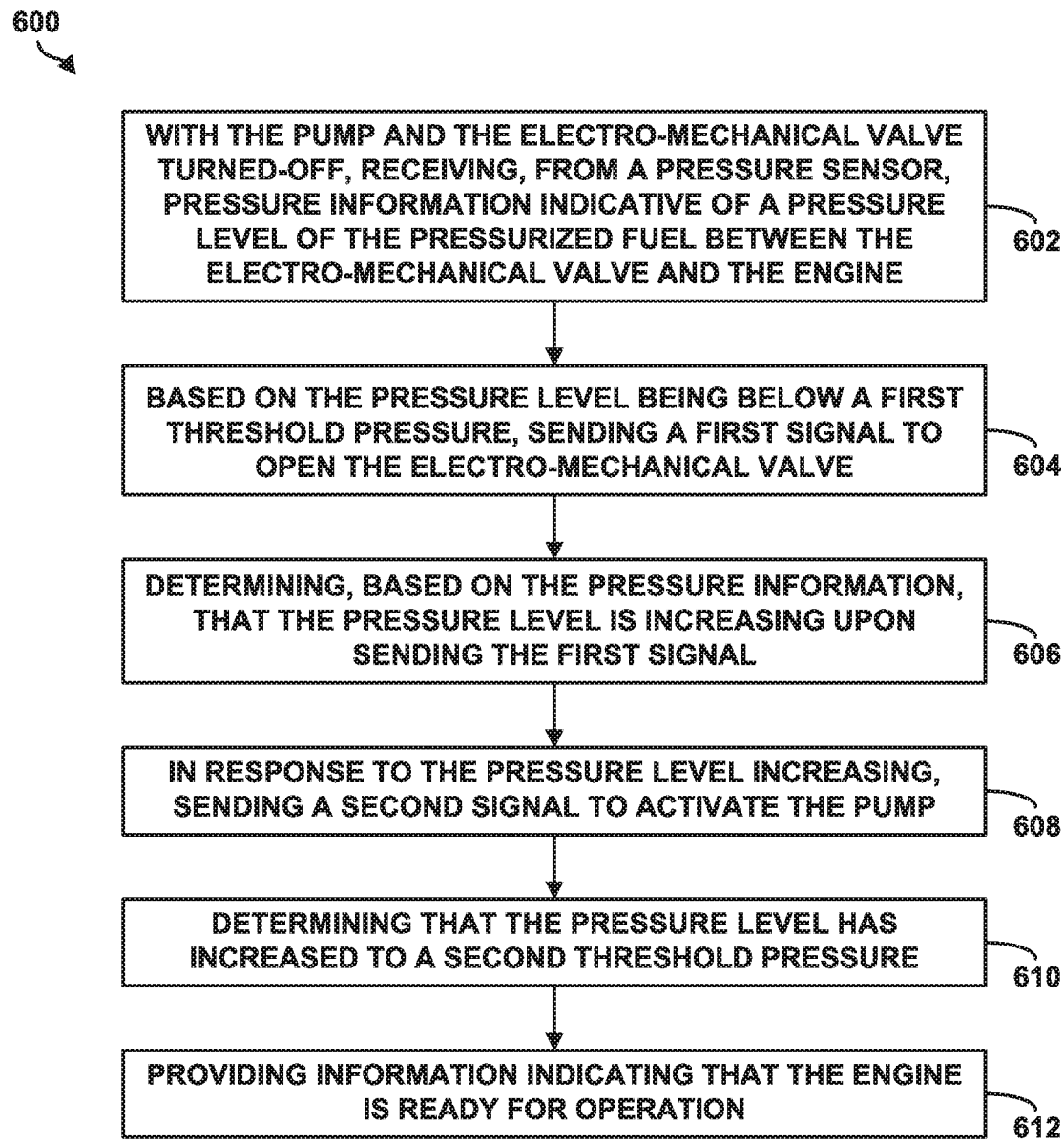
FIG. 6 is a flow chart of a method for determining whether a fuel system is ready for operation prior to running an engine, in accordance with an example implementation.

FIG. 6 is a flow chart 600 of a method for determining whether the fuel system 100 is ready for operation prior to running the engine 110, in accordance with an example implementation. The operations illustrated in the flow chart 600 could be performed, for example, by the controller 134 of the fuel system 100, for example.

The flow chart 600 may include one or more operations, or actions as illustrated by one or more of blocks 602-612. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the flow chart 600 and other processes and operations disclosed herein, the flow chart 600 shows operation of one possible implementation of present examples. In this regard, each block may represent a module, a segment, or a portion of program code, which includes one or more instructions executable by the controller 134 for implementing specific logical operations or steps in the process. The program code may be stored on any type of computer readable medium or memory, for example, such as a storage device including a disk or hard drive. The computer readable medium may include a non-transitory computer readable medium or memory, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example. In addition, for the flow chart 600 and other processes and operations disclosed herein, one or more blocks in FIG. 6 may represent circuitry or digital logic that is arranged to perform the specific logical operations in the process.

At block 602, the flow chart 600 includes, with the pump and the electro-mechanical valve turned-off, receiving, from a pressure sensor, pressure information indicative of a pressure level of the pressurized fuel between the electro-mechanical valve and the engine. As mentioned above, with respect to block 504 of FIG. 5, the controller 134 may receive sensor information from the sensor 118 to determine an initial pressure level in the fuel supply line 116. The initial pressure level is determined while the supply pump 108 and the electro-mechanical valve 114 are turned off.

At block 604, the flow chart 600 includes, based on the pressure level being below a first threshold pressure, sending a first signal to open the electro-mechanical valve. As described above with respect to the block 506, the controller 134 may compare the initial pressure level to a first threshold pressure. If the initial pressure level is less than the first threshold pressure, then the controller 134 determines that the fuel supply line 116 is likely severed, leaking, empty, or cold. Accordingly, the controller 134 sends a signal to the electro-mechanical valve 114 to open it.

At block 606, the flow chart 600 includes determining, based on the pressure information, that the pressure level is increasing upon sending the first signal. The controller 134 monitors the pressure level in the fuel supply line 116 to determine whether the pressure level is increasing upon opening the electro-mechanical valve 114. If the pressure does not increase, the controller 134 may perform the operations associated with the block 512 described above.

However, in response to the pressure level increasing, at block 608, the flow chart 600 includes sending a second signal to activate the pump. The controller 134 sends a signal to activate the supply pump 108 to determine whether the pressure level in the fuel supply line 116 can be boosted when the supply pump 108 is turned on. The controller 134 may then monitor the pressure level to determine whether it increases and stabilizes at a particular pressure level. If the pressure level does not increase or stabilize, the controller 134 may perform the operations associated with the block 512 described above.

At block 610, the flow chart 600 includes determining that the pressure level has increased to a second threshold pressure. The second threshold pressure could be, for example, the boost pressure of the supply pump 108. If the pressure level does not increase to the second threshold pressure, then the controller 134 may determine that the supply pump 108 could be faulty or that the excess flow valve 113B has tripped. The controller 134 may then perform the operations associated with the block 512 described above. If, however, the pressure level increases to the second threshold pressure and is stable, then the controller 134 may determine that the fuel supply line 116 is connected and filled with fuel. The controller 134 may thus determine that the fuel system 100 is ready for operation.

Before providing information indicating that the fuel system 100 is ready, the controller 134 may actuate the supply pump 108 and the electro-mechanical valves 114 and 124 to purge the system. At block 612, the flow chart 600 includes providing information indicating that the engine is ready for operation. If purging is successful, the controller 134 then provides information that the fuel system 100 is ready and may wait for the engine 110 to be turned on.

If the pressure level does not meet the criterion described at blocks 606, 608, or 610, the controller 134 may perform the operations described above with respect to the blocks 512. Based on the result of the operations of the block 512, the controller may execute the operations of the blocks (i) 532, (ii) 534, 536, and 532, or (iii) 534, 536, 520, and 522. If the controller 134 executes operations of the block 522, the controller 134 may then execute operations of the block 524 or the blocks 526, 528. If the controller 134 executes operations of the block 528, the controller 134 may execute operations of the block 530 or 532.

IV. Conclusion

The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

What is claimed is:

1. A system comprising:
a source of pressurized fluid;
an electro-mechanical valve fluidly coupled to the source of pressurized fluid and configured to control flow of the pressurized fluid from the source to a device configured to consume the fluid;
a pressure sensor configured to measure a pressure level of the pressurized fluid between the electro-mechanical valve and the device;
one or more processors;
non-transitory data storage; and
program instructions stored in the non-transitory data storage that, when executed by the one or more processors, cause the one or more processors to perform operations comprising:
receiving, from the pressure sensor, pressure information indicative of the pressure level,
adjusting the pressure information received from the pressure sensor based on a magnitude of a command sent to the source of pressurized fluid, thereby normalizing the pressure information regardless of the magnitude of the command sent to the source of pressurized fluid,
estimating a rate of change of the pressure level with respect to time based on adjusted pressure information,
determining that the adjusted pressure information indicates a potential malfunction in the system based on the rate of change of the pressure level exceeding a predetermined threshold rate of change, and
in response to determining that the adjusted pressure information indicates the potential malfunction, performing a predetermined action.

2. The system of claim 1, wherein preforming the predetermined action comprises:
causing the electro-mechanical valve to reduce flow of the pressurized fluid from the source to the device.

3. The system of claim 1, wherein performing the predetermined action comprises:
causing the electro-mechanical valve to stop flow of the pressurized fluid from the source to the device; and
causing the source to stop providing the pressurized fluid.

4. The system of claim 1, wherein the device is an engine and the pressurized fluid is fuel for the engine, wherein the system further comprises an oxygen sensor coupled to the engine, wherein the oxygen sensor is configured to indicate a performance level of the engine, and wherein performing the predetermined action comprises:
receiving, from the oxygen sensor, oxygen information indicative of the performance level of the engine;
determining that the performance level of the engine is less than a predetermined performance level of the engine; and
in response to determining that the performance level of the engine is less than the predetermined performance level of the engine, determining that a malfunction has occurred in the system.

5. The system of claim 4, wherein the operations further comprise:
causing the electro-mechanical valve to reduce flow of the pressurized fluid from the source to the device.

6. The system of claim 4, wherein the operations further comprise:
causing the source to stop providing the pressurized fluid.

7. The system of claim 1, wherein the system further comprises a display, and wherein performing the predetermined action comprises:
causing the display to indicate that the pressure information matches a predefined malfunction profile.

8. The system of claim 1, wherein the source is an electronically-controlled pump, wherein the device is an engine, and wherein the operations further comprise:
determining an offset pressure value based on (i) the magnitude of the command signal sent to the electronically-controlled pump, and (ii) a commanded amount of flow of the pressurized fluid to the engine, wherein adjusting the pressure information comprises:
modifying the pressure level based on the offset pressure value, wherein determining that the adjusted pressure information indicates the potential malfunction in the system is based on the modified pressure level.

9. The system of claim 1, wherein the source is a pressurized tank or an accumulator.

10. The system of claim 1, further comprising:
a normally-open mechanical shut-off valve disposed between the source and the electro-mechanical valve, wherein the mechanical shut-off valve comprises an inlet port for receiving the pressurized fluid from the source and an outlet port for providing the pressurized fluid to the electro-mechanical valve, wherein the mechanical shut-off valve is configured to shut off the flow of the pressurized fluid to the electro-mechanical valve based on a difference between a first pressure level of the pressurized fluid at the inlet port and a second pressure level of the pressurized fluid at the outlet port.

11. A system comprising:
a fuel supply pump configured to provide pressurized fuel;
an electro-mechanical valve fluidly coupled to the fuel supply pump and configured to control flow of the pressurized fuel from the fuel supply pump to an engine;
a pressure sensor configured to measure a pressure level of the pressurized fuel between the electro-mechanical valve and the engine;
an oxygen sensor coupled to the engine, wherein the oxygen sensor is configured to indicate a performance level of the engine;
a controller;
non-transitory data storage; and
program instructions stored in the non-transitory data storage that, when executed by the controller, cause the controller to perform operations comprising:
receiving, from the pressure sensor, pressure information indicative of the pressure level,
determining that the pressure information indicates a potential malfunction in the system,
in response to determining that the pressure information indicates the potential malfunction, determining, based on oxygen information indicative of the performance level of the engine, that the performance level of the engine is less than a predetermined performance level of the engine,
in response to determining that the performance level of the engine is less than the predetermined performance level of the engine, determining that a malfunction has occurred in the system, and
in response to determining that the malfunction has occurred in the system, performing a predetermined action.

12. The system of claim 11, wherein determining that the pressure information indicates the potential malfunction in the system comprises:
estimating a rate of change of the pressure level with respect to time, wherein the pressure information indicates the potential malfunction when the rate of change of the pressure level exceeds a predetermined threshold rate of change.

13. The system of claim 11, wherein the predetermined action comprises:
causing the electro-mechanical valve to reduce flow of the pressurized fuel from the fuel supply pump to the engine.

14. The system of claim 11, wherein the predetermined action comprises:
causing the fuel supply pump to stop providing the pressurized fuel.

15. A method comprising:
receiving, at a controller from a pressure sensor, pressure information indicative of a pressure level of pressurized fuel in a fuel line between an electro-mechanical valve and an engine;
determining that the pressure information indicates a potential malfunction associated with the fuel line;
in response to determining that the pressure information indicates the potential malfunction, determining, based on oxygen information indicative of a performance level of the engine, that the performance level of the engine is less than a predetermined performance level of the engine;
in response to determining that the performance level of the engine is less than the predetermined performance level of the engine, determining that a malfunction has occurred; and
in response to determining that the malfunction has occurred, performing a predetermined action.

16. The method of claim 15, wherein determining that the pressure information indicates the potential malfunction comprises:
estimating a rate of change of the pressure level with respect to time, wherein the pressure information indicates the potential malfunction when the rate of change of the pressure level exceeds a predetermined threshold rate of change.

17. The method of claim 15, wherein the electro-mechanical valve is fluidly coupled to a fuel supply pump and configured to control flow of the pressurized fuel from the fuel supply pump to the engine, and wherein the predetermined action comprises:
causing the electro-mechanical valve to reduce flow of the pressurized fuel from the fuel supply pump to the engine.

18. The method of claim 15, wherein the predetermined action comprises:
causing a fuel supply pump to stop providing the pressurized fuel.

19. The method of claim 18, wherein the fuel supply pump is an electronically-controlled pump, and wherein the method further comprises:
determining an offset pressure value based on (i) a magnitude of a command signal sent to the electronically-controlled pump, and (ii) a commanded amount of flow of the pressurized fuel to the engine; and modifying the pressure level based on the offset pressure value, wherein determining that the pressure information indicate the potential malfunction in the fuel line is based on the modified pressure level.

\* \* \* \* \*